Patented Sept. 17, 1935

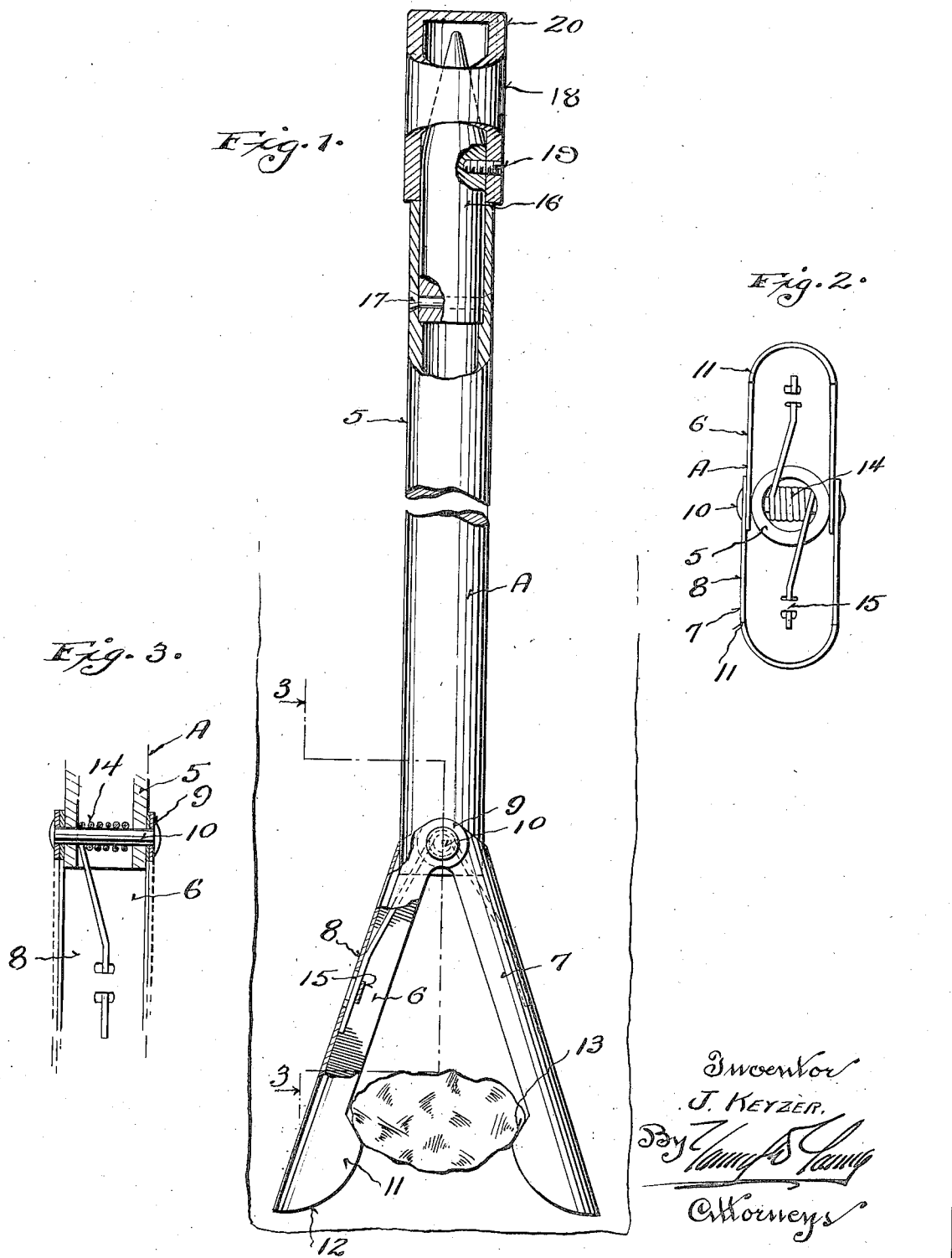

2,014,807

UNITED STATES PATENT OFFICE 2,014,807

POST HOLE STONE PICKER

John Keyzer, West Allis, Wis.

Application August 7, 1933, Serial No. 684,043

1 Claim. (Cl. 294—106)

This invention appertains to tools for facilitating the digging of fence posts and like holes and more particularly to a novel device for removing rocks from the holes, as the same are being dug.

Considerable difficulty is experienced in removing rocks from post holes, as the same are being dug, due to the relatively small diameter and the depth of the holes and it is therefore one of the salient objects of my invention to provide a tool which can be readily inserted in the hole and which will effectively grip the rocks to permit the expeditious removal thereof.

Another primary object of my invention is the provision of a post hole stone picking tool which embodies an elongated handle having pivotally connected with one end thereof a pair of gripping jaws with means for normally urging the jaws toward one another, the leading edges of the jaws being bevelled or on an incline, whereby when the jaws are placed over a rock and forced downwardly, the jaws will be automatically sprung apart to grip the rock to permit the lifting thereof.

A further important object of my invention is the provision of novel means for rockably mounting the jaws on the handle, whereby the jaws will be permitted to swing or float on the handle, so as to follow the contour of the rock and the position thereof in the hole, the jaws being limited in their swinging movement.

A further object of my invention is the provision of a tapered point carried by the opposite end of the handle from the jaws, whereby the tool can be used as a lever or pinch bar for loosening rocks in the hole, the tapered end being adapted to be normally covered by a closure cap capable of use as a tamping head after the post has been inserted in the hole.

A still further object of my invention is to provide an improved rock removing tool of the above character, which will be durable and efficient in use, one that will be simple and easy to manufacture and one which can be placed upon the market at a reasonable cost.

With these and other objects in view, the invention consists in the novel construction, arrangement and formation of parts, as will be hereinafter more specifically described, claimed and illustrated in the accompanying drawing, in which drawing:—

Figure 1 is a side elevation of my complete tool with parts thereof shown broken away and in section to illustrate structural details.

Figure 2 is a bottom plan view of my improved tool showing the jaws in their spread out open position.

Figure 3 is a fragmentary longitudinal section taken on the line 3—3 of Figure 1 looking in the direction of the arrows.

Referring to the drawing in detail, wherein similar reference characters designate the corresponding parts throughout the several views, the letter A generally indicates my improved tool which comprises an elongated tubular handle 5. This handle can be constructed from a suitable length of pipe, if so preferred.

Rockably mounted on the lower end of the handle 5 is a pair of gripping jaws 6 and 7. Each of these jaws embodies elongated shank portions 8 which are of an arcuate shape in cross section. The inner ends of the shanks 8 straddle the lower end of the handle 5 and these shanks have formed thereon overlapping pivot ears 9. A pivot pin 10 is passed through the overlapping ears 9 and through the lower end of the shank.

The inner edges of the shanks 8 at their forward ends are provided with inwardly directed jaw faces 11 and these jaw faces are gradually inclined outwardly as at 12, so as to provide guide edges for directing the stone between the jaws. The inner edges of the jaw faces form abutments 13 for engaging under and gripping the rock.

A coil spring 14 is coiled about the pivot pin 10 and the opposite ends of the spring are passed through struck-out loops 15 formed on the shanks 8 of the jaws. The spring is so tensioned as to draw the jaws toward one another into gripping contact.

In use of my improved tool, the same is inserted within the post hole by means of the handle 5 over the rock to be lifted and downward pressure is exerted on the handle. This will force the jaw faces 11 over the rock, in that the guide edges 12 will spread the jaws apart. The jaws are forced downwardly until the rock is gripped by the abrupt shoulders 13, after which the tool is removed from the hole.

As the jaws spread slightly apart, the same are permitted to swing on the pivot pin 10 which allows the jaws to follow the contour of the rock and the position thereof in the hole.

I secure within the end of the handle 5 remote from the end carrying the jaws 6 and 7, a tapered prong 16 by means of a rivet or the like 17. This prong 16 is useful in loosening the rock or stone within the hole and obviously, the handle 5 of the prong can be utilized as a lever or pinch bar.

Normally, the prong 16 is covered by a removable cap 18. This cap can be held in place by means of a screw 19. The outer end of the cap has a flat face 20 and the cap in connection with the handle can be utilized as a tamping head for packing the dirt around the post when the same is inserted within the hole.

From the foregoing description, it can be seen that I have provided an exceptionally simple and durable tool, which will effectively function to remove rocks from post and like holes.

Changes in details may be made without departing from the spirit or the scope of my invention, but what I claim as new is:—

A tool for removing rocks from post holes comprising, an elongated handle, a pair of jaws of substantially U-shape in cross section having overlapping pivot ears on their inner ends engaging about the forward end of the handle, a pivot pin extending diametrically through the forward end of the handle and through the pivot ears for pivotally connecting the jaws with said handle for independent swinging movement, the inner edges of the jaws at the forward ends thereof being provided with inwardly directed gripping faces, said gripping faces having their forward edges curved outwardly to provide a flared guide entrance and abrupt inner edges to form lifting surfaces, and a spring coiled about the pivot pin having its opposite ends connected with the jaws for normally urging the jaws toward one another.

JOHN KEYZER.